United States Patent [19]

Barre et al.

[11] Patent Number: 4,713,112
[45] Date of Patent: Dec. 15, 1987

[54] PIGMENTARY COMPOSITION FOR THE CATHODIC PROTECTION OF METALLIC SURFACES AGAINST CORROSION, AND PROCESS FOR PREPARING SAID COMPOSITION

[76] Inventors: Maurice Barre, 41 avenue de Chartres, 28570 Abondant; Zdzislaw Kalewicz, 45 avenue Perronet, 92200 Neuilly-sur-Seine, both of France

[21] Appl. No.: 737,868

[22] Filed: May 28, 1985

[30] Foreign Application Priority Data

Jun. 5, 1984 [FR] France .................................. 84 08781

[51] Int. Cl.⁴ .......................... C04B 9/02; C04B 14/00
[52] U.S. Cl. .............................. 106/14.05; 106/288 B; 106/292; 106/308 B; 106/309
[58] Field of Search .................... 106/14.05, 1.17, 309, 106/292, 288 B, 308 B; 252/512

[56] References Cited

U.S. PATENT DOCUMENTS

| | | | |
|---|---|---|---|
| 3,408,312 | 10/1968 | Richards et al. | 252/512 |
| 3,562,124 | 2/1971 | Leon et al. | 106/1.17 |
| 3,884,705 | 5/1975 | Blair | 106/1.17 |
| 4,011,088 | 3/1977 | Makishima | 106/287.18 |
| 4,119,763 | 10/1978 | Blair | 428/450 |
| 4,346,143 | 8/1982 | Young et al. | 428/332 |

*Primary Examiner*—Theodore Morris
*Attorney, Agent, or Firm*—Fisher, Christen & Sabol

[57] ABSTRACT

This invention relates to a process for making a composition for the cathodic protection of metallic surfaces against corrosion and of the type comprising a binding agent and a filler in the state of particles, said filler being based on a metal more anodic than the metal to be protected, such as zinc, and on a substitute material. According to the invention, the process consists in preparing particles formed from said substitute material chosen to be electrically conductive and capable of behaving in cathodic manner with respect to the anodic metal, and provoking, by any appropriate means such as mechanical grinding, chemical coating or electro-plating, the deposit of a layer of the anodic metal on the surface of said particles of the substitute material thus forming coated cores, so that, for each core of substitute material, the thickness of the coating of anodic metal is substantially less than the diameter of the core. The invention is more particularly applicable to a coating for cathodic protection against corrosion, based on zinc.

9 Claims, No Drawings

PIGMENTARY COMPOSITION FOR THE CATHODIC PROTECTION OF METALLIC SURFACES AGAINST CORROSION, AND PROCESS FOR PREPARING SAID COMPOSITION

The present invention relates to a zinc-based pigmentary composition intended for the cathodic protection of metallic surfaces against corrosion, as well as to the process for preparing said composition.

Products are already known which comprise a binding agent and a pigmentary composition based on a metal more anodic than the metal to be protected, such as zinc, mixed with a refractory substitute material such as a metal alloy, and in particular a combined salt of iron.

The purpose of adding said substitute material in the pigmentary composition is known to be to reduce the quantity of anodic metal, generally zinc, included in the composition of the pigmentary composition, whilst conserving the anti-corrosion properties of the composition.

This is a certain advantage, taking into account the relatively high price of zinc, in the form of zinc powder, with respect to the substitute materials which are often inexpensive by-products.

French Pat. No. 2 014 936, for example, describes such a composition in which the pigmentary composition is constituted by zinc powder mixed with finely ground iron phosphide powder constituting a filler mixed with the zinc.

However, the percentage by weight of the substitute material (iron phosphide) with respect to the total composition, cannot exceed, in this known formulation, a limiting value, of the order of 25 to 35%, otherwise the anti-corrosion properties of the composition are reduced or even annulled.

The replacement of zinc by iron phosphide therefore remains limited by imperatives of efficiency and procures only a relative advantage from the standpoint of economy.

It has appeared interesting to seek to increase this limiting percentage representing the upper limit of the relative quantity of the substitute material, incorporated with and in replacement of the zinc in the pigmentary composition.

In addition, the known processes, such as the one described in the Patent mentioned hereinabove, remain relatively expensive to carry out since they necessitate grinding and sifting operations for each of the constituents of the composition which must be carried out under conditions of high precision, taking into account the requirements relative to the possible sizes of the usable particles, of the order of 5 to $20\mu$.

For example, the zinc powder constituted by particles of more than 20 or $30\mu$ always necessitates, as is known, an expensive preliminary grinding which increases the cost price of the final composition.

Consequently, certain zinc powders constituted by particles of relatively large size ($200\mu$) and available at relatively low prices, thus remain unusable.

It is an object of the present invention to overcome these drawbacks and it relates to a process for economically producing an anti-corrosion composition containing only a small, therefore inexpensive, relative quantity of zinc, and presenting corrosion-protection properties which are identical and even superior to those of the known compositions.

To this end, the invention relates to a pulverulent pigmentary composition intended for the cathodic protection of a metallic surface against corrosion, and capable of being applied to said surface, particularly after incorporation in a binding agent, said composition being based, on the one hand, on a metal more anodic than the metal to be protected, such as zinc, and, on the other hand, on a substitute material, said composition being characterized in that it is constituted by particles formed by a core of said substitute material selected from the electrically conductive compounds such as carbides, phosphides, nitrides, borides, silicides, of a metal such as iron, cobalt, nickel, molybdenum, titanium, chromium, zirconium, vanadium, tungsten, thorium, tantalum, cadmium, and in that the core is coated with a coating layer constituted by the anodic metal.

The substitute material forming the core of the particles is preferably iron phosphide and the anodic metal is zinc.

The pigmentary composition optionally also includes additives constituted by particles of auxiliary metals such as manganese, chromium or aluminium.

The invention also relates to a process for preparing a pigmentary composition as specified hereinabove and this process is characterized in that the substitute material is prepared in the form of particles of appropriate granulometry and any means, such as mechanical grinding, chemical coating or electro-plating, are used for provoking the deposit of a layer of the anodic metal on the surface of said particles of the substitute material thus forming the coated particles constituting the pigmentary composition.

The treatment for coating the anodic metal on the cores constituted by the particles of the substitute material is extended until a thickness of the coating of anodic metal allowing the creation of an intermediate zone of diffusion of the ions between the core constituted by substitute metal and the outer coating layer of the anodic metal is obtained.

According to an advantageous embodiment, particles of substitute material on the one hand and particles of anodic metal on the other hand are mixed, the hardness of the substitute material being greater than that of the anodic metal, then the mixture is subjected to a mechanical grinding so as to make a deposit of a layer of the anodic metal on the surface of the particles of the substitute material.

The quantity by weight of anodic metal with respect to the total mixture is advantageously included between 3 and 90% and preferably between 10 and 30%.

Finally, the invention relates to a product in the liquid or pastry state and intended to constitute a corrosion-protective coating, characterized in that it comprises in an appropriate binding agent a pigmentary composition as defined hereinabove introduced in a proportion of between 10 and 95% of the binding agent (independently of the presence of possible volatile diluents), and possible addition of particles of corrosion-inhibiting materials such as chromates, phosphates, molybdates, tungstates.

According to the invention, an inexpensive composition is thus obtained since it is formed for the major part of a substitute material which is cheaper than the anodic metal.

Moreover, the efficiency of the composition according to the invention is equal to and even greater, for a lesser quantity of zinc, than that of the known compositions rich in zinc powder.

In fact, the core behaves in cathodic manner with respect to the zinc coating, which itself performs the role of soluble anode with respect to the metal to be protected.

The zinc therefore electrically protects the metal on which is applied a layer of the composition according to the invention, by its role of soluble anode, source of electrons with respect to said metal.

In parallel, the zone of diffusion between the core and its coating allows the passage of ions from the core towards the zinc, which is thus also protected and more widely available for the so-called cathodic protection of the metal to be protected.

Some embodiments of the invention will be given hereinafter simply by way of illustration.

According to a first embodiment of the invention, zinc is used as anodic metal and iron in the form of iron phosphides is used as substitute material.

Naturally, the invention is not limited to these two precise materials, and it is possible to use other anodic metals, provided that they are more anodic than the metal to be protected, and other substitute materials may be used, provided that they are conductive and that they behave in cathodic manner with respect to the anodic metal chosen.

The formation of cores of iron phosphide coated with zinc may be effected in several ways.

A first mode consists in mixing zinc powder and iron phosphide powder, then in subjecting this mixture to a mechanical grinding.

For example, the size, before simultaneous mixture and grinding, of the zinc particles is between one and several hundreds of microns, whilst that of the particles of substitute material (iron phosphide) is between 1 and 200 microns for example.

Mechanical grinding may be effected in a recipient containing a plurality of steel balls, and subjected to micro-vibrations of high period and short amplitude.

As iron phosphide possesses a mechanical hardness greater than that of zinc, the particles of the latter are broken and crushed against the harder particles of iron phosphide; a deposit is thus formed by crushing of the particles of zinc reduced to a fine granulometry and fixed by mechanical crushing to the surface of the particles of iron; a coating of zinc is thus obtained around the cores constituted by the particles of iron phosphide.

The iron phosphide particles advantageously have an initial size which is substantially equivalent to or slightly smaller than the thickness of the anti-corrosion coating layer which it is desired to apply on the metal to be protected. In fact, during grinding with simultaneous coating, the size of the iron phosphide particles decreases only slightly and a composition is thus obtained, constituted by cores of iron phosphide coated with zinc, capable of constituting, particularly by incorporation in a quantity of appropriate binding agents, a product which is easy to spread and to apply in a given thickness on the metal to be protected.

This thickness is of the order of 10 to 50 microns for example.

In addition, the quantity of binding agent in which the pigmentary composition is incorporated, is determined so that, once transferred onto the surface to be protected, the particles formed by coated cores are in electrical contact with one another.

Without entering into a description of the phenomena occurring at the level of each coated core, it may be of interest to propose an interpretation of the functioning, from the electronic standpoint, of the anti-corrosion cathodic protection offered by the composition according to the invention.

When the pigmentary composition is transferred onto the metal to be protected, the zinc is in contact with the latter and ensures cathodic protection due to the fact that the zinc performs the role of soluble anode with respect to the steel.

In addition and concomitantly, the iron phosphide core performs the role of cathode with respect to the zinc, this enabling the zinc itself to be protected electrically and thus to be more widely available for the cathodic protection of the steel.

The iron phosphide core within each coated particle thus constitutes a source of electrons which may pass through the diffusion barrier located in the zone of contact between the core of iron phosphide and the peripheral coating of zinc, in the direction core-coating.

Similarly, between the zinc coating and the steel, there is a current of electrons, and the zinc coating in turn constitutes a source of electrons with respect to the steel.

In order to facilitate diffusion in the zone of interface between the core and the coating, it is advantageous to use materials for the core and the coating of comparable density.

In this way, for each particle constituted by coated cores, in contact with the steel, what may be referred to as an "alternate cathodic site" is obtained by reason of the alternation seen in space of the role performed by the constituents present, namely: the core, the coating and the metal to be protected.

The composition according to the invention thus goes against the generally accepted principle that the cathodic protection of a coating against corrosion is proportional to the quantity of anodic metal.

In fact, in the composition according to the invention, the relative quantity of zinc for each particle is extremely low since said zinc constitutes only a superficial outer layer coating each core.

For example, Applicants have produced a composition according to the invention with the following proportions by weight:
zinc powder: 20%
iron phosphide: 80%.

The initial size of the particles of each of the constituents is as follows for this example:
zinc powder: 25μ
iron phosphide: 6μ.

The mixture is introduced into a vibrating recipient containing steel balls with a diameter of from 5 to 20 cm, and subjected to vibrations for 120 minutes.

A binding agent such as an epoxy ester resin representing 6.5% by weight of the composition is added to the composition thus produced after simultaneous grinding and coating.

The composition thus produced is projected onto a steel plate of which part is left bare; said plate is then subjected to a so-called "salt spray" test for 15 days in accordance with the conventional standards.

At the end of the test period, the appearance of rust is noted on that part of the steel plate which was left bare, whilst the part coated with the composition according to the invention is bereft of rust, and even of zinc salt called white rust.

Prolonged comparative tests show that a simple mixture of particles of zinc and of iron (in the form of phosphide) in a ratio Zn/F3=20/80 offers only mediocre and highly insufficient protection, whilst the particles coated according to the technique of the invention, whilst employing the same Zn/Fe ratio by weight, constitute an effective protection of which the duration of efficiency is more than doubled.

The invention is in no way limited to the foregoing description, but covers, on the contrary, any variant concerning in particular the means for producing particles constituted by coated cores.

Such zinc coating of each core of iron phosphide may in fact be made by methods other than mechanical grinding, for example by chemical electro-plating. To this end, a bath of a solution containing a zinc salt (zinc sulfate), iron phosphide in suspension associated with a wetting agent, and a reducing acid, is prepared.

A deposit of zinc is thus produced on each core of iron phosphide, in very thin layers and in uniform manner on each core.

In addition, it is possible to use substitute materials other than iron phosphide, provided that they comply with the conditions set forth hereinabove.

In theory, any compound comprising a metallic element may be used. It will be preferred to use metal salts for reasons of convenience of production and of cost, and since it is easier to find a substitute material among them which complies with advantageous additional conditions, such as availability at low cost price.

In order to carry out welding on the metal to be protected, coated with the composition according to the invention, the substitute material forming the core of each particle will be chosen as presenting a melting point substantially of the same order as that of the metal to be protected, in the present case of steel.

Among the metal salts that may be employed, mention may be made of the carbides, phosphides, nitrides, borides, silicides, of a metal such as iron, cobalt, nickel, molybdenum, titanium, chromium, zirconium, vanadium, tungsten, thorium, tantalum and cadmium, this list naturally not being limiting.

The term iron phosphide employed hereinbefore obviously covers iron phosphide FeP and iron diphosphide $Fe_2P$, and/or the mixture of these two bodies.

Nickel phosphide, nickel diphosphide, nickel triphosphide, or the mixture thereof, may also be used as substitute material.

In order to reduce the aggressivity of the environment with respect to the zinc coating on the core, the composition according to the invention may comprise corrosion inhibitors such as chromates, phosphates, plumbates, silico-plumbates, molybdates, tungstates, and other substances containing oxygen both of the oxidizing and non-oxidizing type.

It is also possible to incorporate in the pigmentary composition particles of other metallic materials such as manganese, chromium, aluminium, etc. . . and alloys thereof, in a ratio by weight of between 0.01% and 25% of the total composition.

What is claimed is:

1. A process for preparing a pulverulent pigmentary composition intended for the cathodic protection of a metallic surface against corrosion and capable of being applied to said surface, said pigmentary composition comprising (1) a metal more anodic than the metal to be protected; and (2) a substitute metal constituting an electrically conductive compound selected from the group consisting of carbides, phosphides, nitrides, borides and silicides of iron, cobalt, nickel, molybdenum, titanium, chromium, zirconium, vanadium, tungsten, thorium, tantalum and cadmium, said process comprising preparing said substitute metal, and the metal more anodic than the metal to be protected, in the form of particles of appropriate granulometry, and provoking by mechanical grinding the deposition of a layer of said anodic metal on the surface of the particles of said substitute metal, thus obtaining product particles comprising a core of said substitute metal coated by a coating layer constituted by the anodic metal, the coating process being continued until the thickness of the coating of anodic metal ensures the creation of an intermediate zone of diffusion of the ions between the core of said substitute metal and the outer coating layer of the anodic metal.

2. The process of claim 1 wherein said anodic metal is zinc.

3. The process of claim 1 wherein said anodic metal comprises from 10 to 30% by weight of the total weight of the product particles.

4. A pulverulent pigmentary composition suitable for the cathodic protection of a metallic surface against corrosion and comprising particles having (1) a core of a substitute metal constituting an electrically conductive compound selected from the group consisting of carbides, phosphides, nitrides, borides and silicides of iron, cobalt, nickel, molybdenum, titanium, chromium, zirconium, vanadium, tungsten, thorium, tantalum and cadmium; (2) a coating layer of a metal more anodic than the metal to be protected; and (3) an intermediate ion diffusion zone between said core and said coating layer, said particles having been produced by a process according to claim 1.

5. The pulverulent pigmentary composition of claim 4 wherein said anodic metal is zinc.

6. The pulverulent pigmentary composition of claim 4 wherein said anodic metal comprises from 10 to 30% by weight of the total weight of the particles.

7. A pulverulent pigmentary composition suitable for the cathodic protection of a metallic surface against corrosion, comprising particles having a core of an iron phosphide, a coating layer of zinc, and an intermediate ion diffusion zone between said core and said coating layer.

8. The process of claim 1 wherein particles of said substitute material and particles of said anodic metal are mixed, the hardness of the substitute material being greater than that of the anodic metal, and the resulting mixture is subjected to a mechanical grinding operation in a receptacle containing a plurality of steel balls so as to make a deposit of a layer of the anodic metal on the surface of the particles of the substitute material.

9. The process of claim 8,
wherein the quantity by weight of anodic metal with respect to the total mixture is included between 3 and 90%.

* * * * *